United States Patent [19]

Lerwill

[11] Patent Number: 4,463,825
[45] Date of Patent: Aug. 7, 1984

[54] METHOD AND APPARATUS FOR GENERATION OF ACOUSTIC ENERGY

[75] Inventor: William E. Lerwill, Tulsa, Okla.

[73] Assignee: James M. Bird, Tulsa, Okla.

[21] Appl. No.: 393,014

[22] Filed: Jun. 28, 1982

[30] Foreign Application Priority Data

Jul. 3, 1981 [GB] United Kingdom ............... 8120636

[51] Int. Cl.$^3$ .................... G01V 1/157; G01V 1/38
[52] U.S. Cl. .................................. 181/113; 367/147
[58] Field of Search ............... 181/106, 113; 367/142, 367/147; 175/1; 340/400, 401; 310/12

[56] References Cited

U.S. PATENT DOCUMENTS

| | | | |
|---|---|---|---|
| 1,678,182 | 7/1928 | Estes | 367/142 |
| 2,522,433 | 9/1950 | Dahlberg | 181/106 |
| 2,648,837 | 8/1953 | Mounce | 181/113 |
| 3,258,741 | 6/1966 | Clark | 367/147 |
| 3,792,425 | 2/1974 | Magneville et al. | 367/142 |

FOREIGN PATENT DOCUMENTS

| | | | |
|---|---|---|---|
| 475580 | 7/1966 | U.S.S.R. | 181/113 |
| 321774 | 2/1972 | U.S.S.R. | 181/113 |

OTHER PUBLICATIONS

B. Goode, "Interleaved-Plate Electrodynamic Transducer", pp. 1-5, NTIS AD214347, Report 883.
"New Sonal Thumper . . . Subbottom," 2/3/61, Electronics, pp. 56-57.

Primary Examiner—Nelson Moskowitz
Attorney, Agent, or Firm—Kanz, Scherback, and Timmons

[57] ABSTRACT

Method and apparatus for the generation of low frequency acoustic energy such as may be employed in carrying out seismic surveys in marine environment. In imparting an acoustic energy pulse into a body of water, a planar electroacoustic transducer having parallel transducer plates is employed. The transducer plates have conforming electrical conductive paths. An impulse of opposed current flow is applied to the conductive paths to produce an electromagnetic field between the conforming paths which forces the transducer plates apart, generating an acoustic impulse having a center band frequency of less than 350 hertz. The wave length of the acoustic impulse at this frequency is less than twice the major planar axis of the transducer. The conductive paths may be formed of elongated conductors which are oblong in cross section and cover most of the radiating surface of the transducer.

19 Claims, 9 Drawing Figures

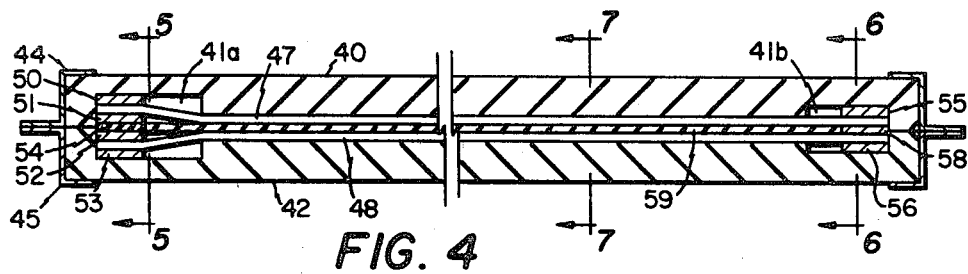
FIG. 4
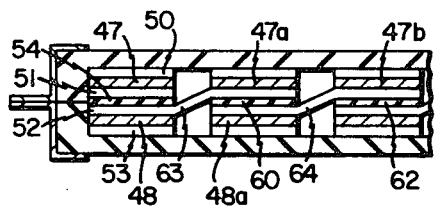
FIG. 5
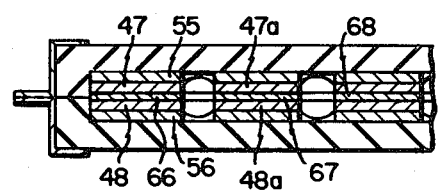
FIG. 6
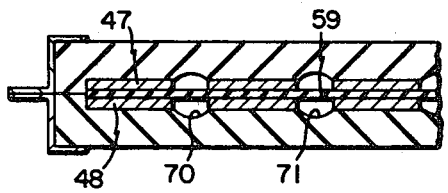
FIG. 7
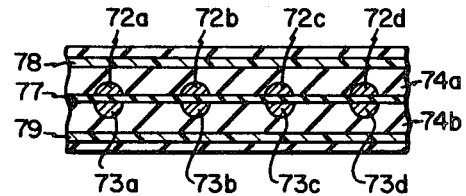
FIG. 8
FIG. 9
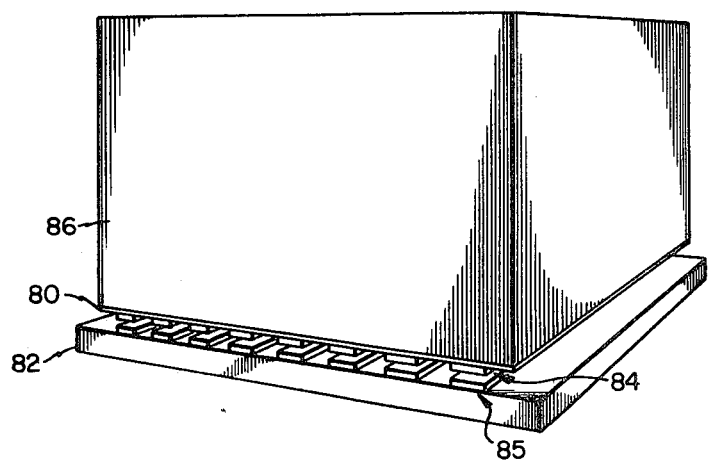

METHOD AND APPARATUS FOR GENERATION OF ACOUSTIC ENERGY

DESCRIPTION

1. Technical Field

This invention relates to the generation of acuostic energy and more particularly to the generation of acoustic signals of the type useful in seismic exploration and the like.

2. Background of Invention

There are various applications which involve the transmission of an acoustic signal and its detection in order to characterize the transmitting medium or a reflecting interface. Such acoustic signals may be transmitted over distances ranging from a few feet to several miles and may vary from the low frequency range used in seismic exploration to the ultrasonic range used in some well-logging procedures.

Electroacoustic transducers are usually employed in well-logging applications. For example, U.S. Pat. No. 3,258,741 to Clark discloses an electroacoustic transducer which is mounted in an elongated casing adapted for insertion into a borehole. The signal generator disclosed in this reference comprises two spiral coils formed of an electrically conductive material which are secured to closely spaced parallel plates. The two coils are electrically connected with respect to one another so that when a surge of current is passed through the coils, the resulting magnetic fields oppose one another, thereby resulting in a rapid movement of the coils and their attendant plates away from one another. Current flow to the coils is provided by discharging a capacitor which is sufficiently large to provide a current flow of several thousand amperes.

In a further embodiment disclosed in the Clark patent, one of the plates carrying one of the plate-coil configurations is secured to a rigid member constructed of a suitable nonmagnetic material which is fastened to the casing. This system, in which only one plate is activated, is described as being useful in making seismic surveys where it is desired to direct the acoustic signals downwardly into lower formations.

A somewhat similar electroacoustic transducer is disclosed in U.S. Pat. No. 2,648,837 to Mounce. This transducer system is described as being useful in the generation of acoustic pulses such as may be employed in the determination of seismic velocities in wells or in measuring the elapsed time between the transmission of an acoustic impulse and the return of an echo. The Mounce device comprises two conforming coils which are electrically connected in series opposition and which are embedded in a dense resilient rubber casing. The rubber casing may be provided with an interior cavity which is connected to a source of gas under pressure which thus provides a pressure equalizing system when the transducer is used in a high pressure environment. Specifically disclosed in Mounce is a transducer formed by winding 17 gauge copper wire to form two Archimedian spiral coils approximately 3.5" diameter and each containing 26 turns. The coils were embedded in a rubber casing having a total diameter of 4.5 inches and a thickness of 1 inch. This transducer was energized by discharging a 20 microfarad bank of capacitors charged to 1500 volts.

Another use of acoustic energy involves seismic exploration. In conducting seismic surveys in a marine environment the seismic energy source, which may be an explosive charge, a gas exploder, a spark or eddy-current discharge device, an airgun or a watergun, generates a powerful impulse into the sea water. The resulting compressional wave is radiated into the earth where it is reflected from the various subsurface layers that exist, and is subsequently detected by an array of hydrophones towed by the exploration vessel in which instruments are carried for recording the signals.

Ideally, the acoustic impulse would contain only those frequency components covering the spectrum of interest, which may be about 5 to 200 Hz or, in some special high resolution near-surface problems, as high as 500 Hz. However, in the currently used seismic sources mentioned above, there is very little control over the spectrum of the wavelet. In the case of the airgun, which is the most commonly used marine source, an air bubble continues to oscillate long after the primary impulse. Various steps may be taken to suppress this interference. For example, the seismic signal may be generated by a "tuned" array of guns in which each gun has a selected bubble period so that they add out-of-phase. Alternatively, a deconvolution technique may be employed in the subsequent signal processing. In the former method, it has been found necessary to de-tune the array in order to augment the low frequency part of the spectrum which is essential for deep penetration within the earth's crust. Thus, it has been found that, although the primary pulse might appear to be a good approximation to the broad-band impulse which is required in order to obtain a seismic record of high resolution, the low frequency components are supplied by the more powerful bubble effect which, in the early part of the record, presents unwanted interference.

A significant problem with existing marine seismic sources lies in the fact that, at the wavelengths of the generated acoustic signals they are effectively point-sources which, would be expected to be very inefficient radiators of low frequency waves. Ideally, the radiating surface of an acoustic source would be a sphere or disk with a diameter approaching the wavelength corresponding to the center-band frequency of the desired wavelet. However, this has previously been considered to be impractical since it would require a surface area for the source of about 12 to 300 square meters, depending on the frequency spectrum of the desired wavelet. Arrays of point-sources have been employed to obtain directional radiation, but the individual elements are still point-sources with their characteristic bubble noise and poor efficiency.

Another problem with existing sources, particularly the airguns, concerns the timing accuracy of the firing command. The gun is fired by an electromechanical device which introduces unknown and variable time delays between the command pulse and the instant of actually radiating the seismic pulse. Therefore it is necessary to sense, by some independent means such as electrodes or a hydrophone, the onset of the radiated pulse so that its time can be synchronized with the start of the seismic record. In the development of this technique, complex control circuits and display panels have been found necessary to allow the operator to monitor the time variations and make the appropriate corrections.

DISCLOSURE OF THE INVENTION

In accordance with the present invention there is provided a new and improved method and apparatus for the generation of acoustic energy by means of a planar electroacoustic transducer. The transducer comprises first and second transducer plates, each of which has a conforming electrical conductive path. The transducer plates are secured together in a juxtaposed position in which the conductive paths are spaced from one another in a close conforming relationship. The transducer is disposed in a body of water and an impulse of opposed curent flow is produced in adjacent portions of the conductive paths. The resulting electromagnetic field between the conforming conductive paths forces the transducer plates apart to generate an acoustic impulse having a center band frequency of 350 Hz or less. The corresponding center band wavelength is less than twice the major planar axis of the transducer. In a preferred embodiment of the invention the transducer is elongated in shape and is moved through the water along its major axis while repeatedly generating acoustic impulses therefrom.

In a further aspect of the invention, there is provided an acoustic energy source in which a first transducer plate has a plurality of elongated electrical conductors of oblong cross section arranged in a first array. A second transducer plate also has a plurality of elongated electrical conductors of oblong cross section which are arranged in a second array conforming to the first array. In both arrays, the minor cross-sectional dimensions of the conductors extend transversely of the transducer plates. The transducer plates are secured in a juxtaposed position in which the arrays are spaced from one another in a close conforming relationship. The acoustic energy source also includes electrical power supply means connected to the conductor arrays for providing current flow in each pair of adjacent conforming conductors in opposite directions. Thus the electromagnetic field produced between adjacent conforming conductors forces the transducer plates apart.

BRIEF DESCRIPTION OF THE DRAWINGS

FIG. 4 is an elongated sectional view of a marine transducer embodying the present invention.

FIG. 5 is a cross-sectional view taken along line 5—5 of FIG. 4.

FIG. 6 is a cross-sectional view taken along line 6—6 of FIG. 4.

FIG. 7 is a cross-sectional view taken along line 7—7 of FIG. 4.

FIG. 8 is a cross-sectional view showing a modified form of conductors employed in yet another embodiment of the invention.

FIG. 9 is another embodiment of the invention as employed in a land seismic source.

BEST MODES FOR CARRYING OUT THE INVENTION

Figure 1:
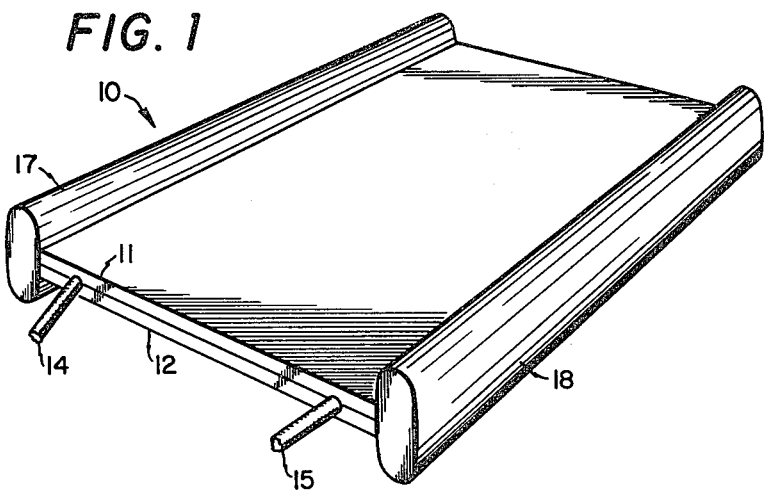
FIG. 1 is a perspective view of a marine seismic transducer embodying the present invention.

As is well known to those skilled in the art, the total electrical impedance presented to the voltage source used to drive an electromagnetic acoustic transducer is the sum of the internal electrical resistance of the transducer and the motional impedance. The electrical resistance is a function of the transducer and the motional impedance is a function of the transducer and the transmission medium. This may be illustrated by reference to the simple case of a moving-coil transducer such as a loud speaker in which a conductive coil is moved through a magnetic field. The total impedance, $Z_t$, presented to a power amplifier used to drive the transducer is characterized by the following relationship:

$$Z_t = R + Z_m \qquad (1)$$

Wherein:
R is the DC resistance of the coil, and
$Z_m$ is the motional impedance. The motional impedance, $Z_m$, may be characterized by the following relationship:

$$Z_m = \frac{(Bl)^2}{Z_r} \qquad (2)$$

Wherein:
B is the flux density of the magnetic field
l is the length of the conductor in the coil and
$Z_r$ is the radiation impedance of the transmission medium.

As is known to those skilled in the art the efficiency, E, of the transducer, discounting other factors which need not be considered here, is defined by the relationship:

$$E = \frac{Z_m}{R + Z_m} \qquad (3)$$

or, by defining the motional impedance in terms of equation (2), by the following relationship:

$$E = \frac{(Bl)^2/Z_r}{R + (Bl)^2/Z_r} \qquad (4)$$

The radiation impedance, $Z_r$, has a real or resistive component and an imaginary or reactive component. The significance of these components in the complex radiation impedance depends upon the relationship between the size of the radiating surface of the transducer and the frequency of the transmitted signal. For example, where the diameter of the radiating surface, e.g. the loud speaker diaphragm, is very small relative to the wave length of the transmitted acoustic signal, the radiation resistance becomes quite small relative to the radiation reactance. On the other hand, as the diameter of the radiating surface is increased, the resistance becomes the more significant component.

The relationships described above obtain in the case of parallel conductor transducers, such as the types disclosed in the aforementioned patents to Clark and Mounce. Such transducers operate on a well known principle that parallel conductors carrying currents in opposite directions tend to be repelled from one another. For a single wire carrying a current, the flux density, B, surrounding the wire at a distance r from the center of the wire is indicated by the relationship:

$$B = \frac{\mu_o I}{2\pi r} \qquad (5)$$

$\mu_o$ is the magnetic permeability surrounding the wire and
I is the current.

In the case of two wires carrying currents $I_1$ and $I_2$ the force acting between the wires is given by the equation:

$$F = \frac{\mu_o I_1 I_2 l}{2\pi r} \quad (6)$$

Wherein:
l is the common length of the wires, and
r is the distance between the centers of the wires.

The motional impedance $Z_m$ of the parallel conductor transducer is given by the relationship:

$$Z_m = \frac{(I\mu_o l)^2}{(2\pi r)^2 Z_r A} \quad (7)$$

Wherein:
I is the current through the repelling conductors
$\mu_o$ is the permeability of free space which is $4\pi \times 10^{-7}$
l is the common length of the conductors
$Z_r$ is the radiation impedance of the transmitting medium and
A is the area of the radiating surface.

It will be recognized that equation (7) is a simplified relationship because of the assumption that the current flowing through each of the repelling conductors is the same. This in fact will be the case where, as in the preferred embodiment described hereinafter, the repelling conductors are connected in series. In the case where the equivalent diameter or major axis of the transducer is at least one half of the wave length of the acoustic impulse at the center band frequency, the resistive component of the complex radiation impedance will predominate and the reactance or imaginary component can be ignored. In this case, the radiation impedance can be taken as equal to the specific acoustic impedance which is the product of the specific density, P, and the propagation velocity c of the transmission medium.

Referring now to the drawings, FIG. 1 illustrates a perspective view of an embodiment of the present invention in an acoustic energy source of the type useful in carrying out marine seismic exploration. More particularly and as illustrated in FIG. 1, the transducer comprises upper and lower transducer plates 11 and 12 which are adapted to be forced apart upon the imposition of opposed current flow through conforming conductive paths (not shown) associated with the transducer plates. The transducer is equipped with towing leads 14 and 15 which may be used for towing the transducer behind a seismic vessel and longitudinally extending stabilizers 17 and 18. Stabilizers 17 and 18 function to maintain the transducer relatively horizontal within the water so that the directional acoustic energy generated from the radiating surface will travel downwardly. Stabilizers 17 and 18 may also be used to provide chambers for compressed air storage in the event that it is desired to pressurize the interior of the transducer to offset the hydrostatic pressure occurring at the depths at which the transducer is towed through the water. In this regard it will normally be desirable to tow the transducer behind the seismic recording vessel at depths of about 25 to 50 feet.

Figure 2:
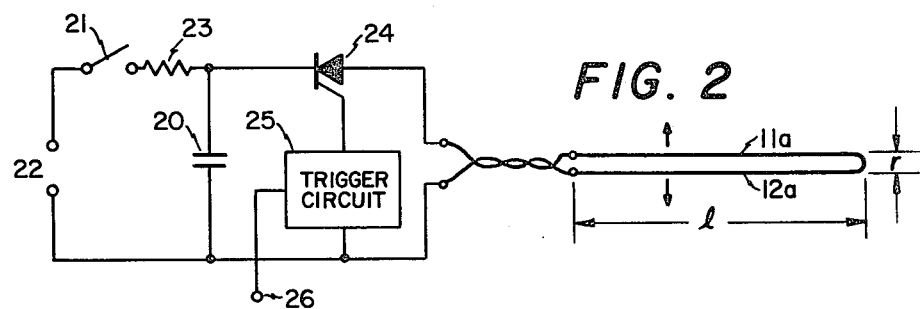
FIG. 2 is a circuit schematic of a suitable electrical power supply for the transducer.

Turning now to FIG. 2, there is illustrated a simplified circuit schematic of the conductive paths in the transducer plates and the associated electrical power supply for providing opposed current flow through the conductors. As illustrated in FIG. 2, the conductive paths associated with plates 11 and 12 are depicted schematically by single wire conductors 11a and 12a, respectively which are connected in series with each other for opposed current flow and across the terminals of a capacitance bank 20. While the capacitance bank is indicated by a single capacitor, it will be recognized that a plurality of capacitors connected in parallel may be, and normally will be, employed in carrying out the invention. The capacitance bank 20 is connected through a switch 21 to a uni-directional voltage source 22 which is employed when switch 21 is closed to charge the capacitor through a suitable current limiting means such as indicated by resistor 23. The capacitance bank is connected to the conductors 11a and 12a through a current switching device 24 which is under the control of a trigger circuit 25. Upon the application of a signal pulse to terminal 26 of the trigger circuit, switch 24 is turned on, thus discharging the capacitor through conductors 11a and 12a.

The pressure amplitude of the acoustic impulse generated by the transducer is a function of the repelling force acting between the conductors 11a and 12a. As indicated by equation (6), the force is inversely proportional to the distance r between the centers of the conductors and is directly proportional to the current flow through each conductor and the common length l of the conductors. As will be recalled from equation (3), the efficiency, E, of the transducer is effected adversely by the electrical resistance of the conductors and also by the distance between the parallel conductors. The resistance, of course, can be decreased by increasing the cross-sectional area of the conductors but in the normal course of events this also increases their diameters thus increasing the center to center distance r. In addition, the effective cross-sectional area of the conductors is decreased because of a relatively high current density along the periphery of the conductors due to the "skin effect" induced by high frequency transients in the current impulse from the capacitor bank.

In accordance with one aspect of the present invention, these conflicting values are reconciled by employing conductors in the transducer plate which are oblong in their cross-sectional geometry. The conductors are arranged such that their minor cross-sectional dimensions extend transversely of the transducer plates. For a given cross-sectional area and hence a given electrical resistance, the use of oblong cross-sectional conductors enables the attainment of a better distribution of force and a greater cross-sectional perimeter, thus minimizing the skin effect due to transients in the current impulse, then is possible in a case of a conventional, round conductor. The degree to which this is achieved depends upon the differential of the major and minor dimensions of the cross-section. It is preferred in carrying out the invention to provide a ratio of the major cross-sectional dimension to the minor cross-sectional dimension of the conductor of at least 2 and, except in the case where semi-circles or like arc segments are employed as described hereinafter, it is preferred that the ratio of the major dimension to the minor dimension of the conductor cross-section be at least 20, and it may be in excess of 100 as in the example given hereinafter.

Figure 3:
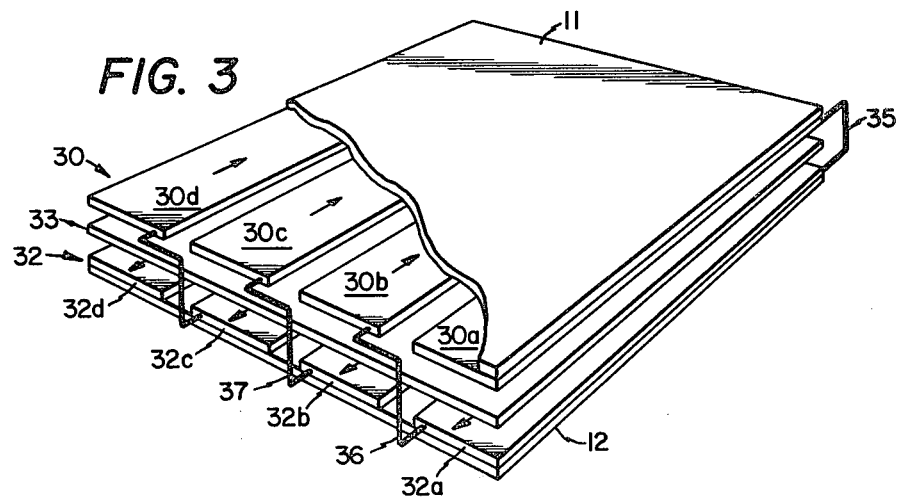
FIG. 3 is an exploded schematic view of the transducer of FIG. 1.

FIG. 3 illustrates an exploded view of a portion of the transducer with parts broken away to illustrate the conductor arrays of the transducer plates 11 and 12. As shown, the upper conductor array comprises four conductor strips 30a through 30d. The lower conductor array 32 supported on plate 12 comprises conductors 32a through 32d which as illustrated are oriented similarly as the conductors in array 30 so that the two arrays conform with one another. The adjacent conductors of the two arrays are separated from each other by a thin layer of insulating material 33. The transducer plates 11 and 12 are formed of a flexible or deformable material such as rubber or plastic so that the conforming conductor segments are pressed against the insulating material by the hydrostatic head of the water of the depth at which the transducer is towed. This provides for a relatively small center-center distance between adjacent conductor segments from the two arrays.

The power supply is connected to the conductor arrays in a manner to provide opposed current flow in each pair of adjacent conforming conductors. Thus the current flow in conductor 30a must be opposed to the current flow in conductor 32a although it need not necessarily be opposed to the current flow in the more remote conductors of the second conductor array 32. For example, each of the conductors in array 30 could be connected in series with the next adjacent conductor in the same array and array 30 then connected in series with array 32. However, it is preferred that the current flow in the adjacent conductors of the same array be in the same direction. Thus, the current flow in the conductors of array 30 is in one direction and the current flow in the conductors of the array 32 in the opposite direction. While this may be accomplished by various means it is preferred to connect the conductor segments of both arrays in series with the conductors of one array electrically interposed between the conductors of the other array. Thus, the remote ends, as viewed in FIG. 3, of each pair of conforming conductors are connected together. For example, the remote end of conductor 30a is connected to conductor 32a (as indicated by electrical connection 35), the remote end of conductor 30b is connected to the remote end of conductor 32b and so on. The near ends, as viewed in FIG. 3, of the conductors are connected to a nonconforming segment in the opposite array. Thus, the near end of conductor 32a is connected with the adjacent end of conductor 30b and the near end of conductor 32b is connected to conductor 30c by electrical connections 36 and 37, respectively. This configuration in which the series connection of conductors alternates between the two arrays provides for relatively small differences in potential between adjacent conductors.

It will be realized that the conductors and arrays can be connected to the electrical power in any suitable manner which provides the necessary opposing current flow. For example, the conductor array can be supplied with current from two separate voltage sources. One source may be a steady state source providing a field current and the other a pulsed source providing a signal current impulse each time the transducer is to be fired. Alternatively, two simultaneous current impulses from two voltage sources could be employed. Also, the conductors within an array can be connected in parallel. For example, the conductors in arrays 30 and 32 could be connected in parallel and the arrays then connected in series or in parallel with one another. However, the series connection of individual conductors as described above is preferred since this provides for maximum current flow through each conductor segment for a given voltage supply. In this regard, it will be recalled that the motional impedance is equal to or greater than the internal electrical resistance of the transducer. Thus, although parallel connection of the conductor segments will reduce the resistance and enable a somewhat greater total current flow to the transducer, current splitting due to the parallel connections will result in a smaller current through each conductor.

As indicated previously the transducer has a radiating surface which is large enough to provide a favorable impedance match with the resistive component of the complex radiation impedance at the center frequency of the acoustic impulse. Stated in terms of the theoretical case in which a flat circular transducer is used, the diameter of the transducer is at least one-half of the center-frequency wave length of the acoustic impulse. Where the transducer is another geometrical shape, the equivalent diameter of the transducer may be taken as equal to its major axis and must be at least one-half of the centerband wave length of the acoustic impulse. Thus, in the case of a square transducer the equivalent diameter would be the length of its side and in the case of an elongated rectangular transducer the equivalent diameter would be equal to the length of its longest side.

In the case where the effective diameter or major axis of the transducer is sufficiently large so that the reactance of the radiation impedance of the transmission medium can be discounted, the radiation impedance is equal to the specific acoustic impedance and equation (7) can be written as follows:

$$Z_m = \frac{(I\mu_0 l)^2}{(2\pi r_e)^2 \rho c A} \tag{8}$$

Wherein:
I is the amplitude of said current impulse in amps
$\mu_o$ is the permeability of free space
l is the total cumulative length of said current paths in meters
$r_e$ is the effective radial distance between said current paths in meters
c is the velocity of sound in said water in meters/sec.
$\rho$ is the density of the water in kilograms per cubic meter
A is the radiating area of said transducer in square meters In the case of water, the acoustic velocity is approximately 1500 meters per second and the density 1,000 kilograms per cubic meters so the product $\rho c$ can be taken as equal to $1.5 \times 10^6$ kg/m².sec. Since the total impedance of the transducer is the sum of the motional impedance and the internal electrical resistance and since the resistance is equal to or less than the motional impedance, the resistance, R, of the current path through the conductor segments of the arrays 30 and 32 (FIG. 3) may be defined by the following relationship:

$$R \leq Z_m = \frac{(I\mu_0 l)^2}{1.5 \times 10^6 (2\pi r_e)^2 A} \tag{9}$$

Wherein:
I, $\mu_o$, l, $r_e$, and A, are as defined above with respect to equation 8.
When equation (9) is solved for I it becomes:

$$I \geq \frac{2450 \, r_e (AR)^{\frac{1}{2}}}{\mu_o l} \tag{10}$$

Thus the capacitor 20 in FIG. 2 must be charged to a voltage sufficient to produce a current impulse as defined by equation (10).

As will be understood by those skilled in the art the frequency range and center band frequency of the acoustic impulse generated by the transducer is determined by the rise time of the current impulse upon the discharge of the capacitor 20 (FIG. 2). The rise time is in turn directly proportional to the discharge time or time constant which is determined by the total load impedance of the transducer and the capacitance of the capacitor bank in accordance with the following relationship:

$$C = \frac{t}{Z_t}$$

Wherein:
C is the capacitance in farads
t is the time in seconds equal to the required discharge period
$Z_t$ is the total impedance in electrical ohms of the transducer as determined by the resitance and the motional impedance. Based upon empirical considerations, the required discharge time of the capacitor (for the capacitor to discharge to a point where the current is 36.8% of the initial value) is equal to the reciprocal of the center band frequency of the acoustic impulse. In order to satisfy the requirement that the equivalent diameter or major axis of the transducer be at least one-half of the center-frequency wave length and recalling that the acoustic velocity of water is 1500 meters per second, the relationship between the center frequency and the equivalent diameter of the transducer may be indicated by the following equation.

$$d_e \geq \tfrac{1}{2}\lambda = \frac{1500}{2f} \quad (12)$$

Wherein:
f is the frequency in $H_z$
$d_e$ is the equivalent diameter or major axis of the transducer in meters. Thus, from equations 11 and 12 the minimum capacitance of the capacitor bank is defined by the relationship:

$$C \geq \frac{d_e}{750 \, Z_t} \quad (13)$$

Since the total impedance $Z_t$ is equal to the sum of the electrical resistance of the transducer and the motional impedance, equation 13 may be written as follows:

$$C \geq \frac{d_e}{750\left(R + \frac{(I\mu_o l)^2}{1.5 \times 10^6 (2\pi r_e)^2 A}\right)} \quad (14)$$

The effective radial distance, $r_e$ in the case of conventional circular conductors will be the center-center distance between the conductors. For conductors of oblong cross section as disclosed herein, the effective radial distance will be somewhat greater than the actual center-center distance. In this case the effective radial distance, $r_e$, may be approximated by the following relationship:

$$r_e = d\left(\frac{d}{r}\right)^{\tfrac{1}{2}} \quad (15)$$

Wherein:
r is the distance between the centers of conforming conductors.
d is the distance between the centers of the equivalent circular conductors having the same cross-sectional area as the oblong conductors.

As noted previously, the transducer of the present invention may be constructed in any suitable geometric configuration. The forward and leading edges of the transducer may be shaped for streamline movement through the water as it is towed submerged by the seismic vessel. The transducer plates themselves, or at least the bottom transducer plate, should provide a smooth radiating surface. While in the embodiments of the invention thus far described, the planar geometry of the transducer is generally rectangular, in some cases it may be desirable to employ a disc-shaped transducer. A transducer of this configuration may be more convenient from the standpoint of achieving a water tight seal around its periphery.

It can be seen from the foregoing description that the size of the transducer presents somewhat conflicting considerations. It is necessary to have a relatively large radiating surface in order to satisfy the requirement for impedance matching between the transducer and the transmission medium. On the other hand, a relatively large surface area tends to work against the desired relationship between the motional impedance and the internal electrical resistance of the transducer. In this regard, the motional impedance is inversely proportional to the area (equation 7), whereas the resistance can be expected to increase with area because of the increased length of the conductive paths through the transducer plates. In order to reconcile these conflicting values, it is preferred, particularly where the center band frequency is relatively low, i.e. on the order of 75 hertz or less, to employ a transducer having an elongated configuration and to tow the transducer through the water along its long axis. Specifically, it is preferred in this embodiment of the invention to employ a length to width ratio for the transducer of at least 5. This allows the attainment of a relatively directional acoustic impulse along the axis of the seismic survey while retaining the area of the radiating transducer surface within acceptable limits.

Regardless of the geometry of the transducer most applications will require a major axis of at least 2 meters in order to achieve the desired impedance match. In many cases substantially larger dimensions will be called for. For example, most marine seismic surveys are carried out with impulses having center frequencies of about 100 or less, requiring that the transducer have a major axis of 7 meters or more.

The transducers of the present invention may be coupled together in an array of two or more transducers. Where the transducers are relatively square or disk-shaped, they may be connected in tandem. Where they are elongated, a plurality of transducers may be connected in parallel. The transducers should be towed behind the seismic vessel sufficiently close to each other so that they interact. In this regard, the spacing between adjacent transducers should be less than one-half of the center frequency wave length.

Returning to the drawings, FIG. 4 illustrates specific details of a transducer in which the arrays are composed of parallel conductor segments as shown schematically in FIG. 3. More particularly, FIG. 4 is a side elevational view taken along a cross-section between adjacent conductor segments. As disclosed in FIG. 4, the transducer comprises upper and lower transducer plates 40 and 42, respectively, which are secured together and held in place at their edges by mounting frame channels 44 and 45. The channels 44 and 45 are secured together at their abutting flanges by any suitable means (not shown). The transducer plates 40 and 42 may be formed of molded rubber or other suitable elastomeric material having a thickness of about 1½ inches. Supported on the transducer plates are flat, elongated copper strips 47 and 48 which form the conductor segments. The copper strips are held in place at one end by brass bus-bar clamps 50, 51, 52 and 53. The copper strips may be about 5½" wide and about 0.04" thick. Interposed between the interior bus-bar clamps 51 and 52 is a spacer 54 formed of suitable insulating material such as neoprene rubber. At the other end of the transducer, the conductor segments are held in place by brass clamps 55 and 56. Interposed between the copper strips at this end of the transducer is a spacer 58 formed of a suitable conductor such as copper. The copper strips 47 and 48 are separated from one another throughout their lengths by a sheet 59 of insulating material which acts to insulate the upper and lower conductor segments from each other and hold them in a closely spaced-apart relationship. The insulating sheet may be formed of Mylar plastic having a thickness of about 3 mils.

FIG. 5 is a cross-sectional view taken along line 4—4 of FIG. 4 showing the relationship of the conductor segments in the two arrays and the bus-bar clamps at one end of the transducer. As indicated each conforming pair of conductor segments are separated at this end by insulated spacers 54, 60, and 62. For each pair of conforming conductor segments, one of the interior bus-bar clamps forms a "crossover" connection as indicated by reference numerals 63 and 64. Thus the conductor strip 48 in the lower array is connected in series with the next adjacent conductor strip 47a in the upper array. Similarly, the conductor strip 48a in the lower array is also connected to the upper array strip 47b of the adjacent pair of conductors. FIG. 6 is a cross-sectional view taken along line 6—6 of FIG. 4 and showing the relationship between the conductor segments at the other end of the transducer. As there indicated, each pair of conforming conductors are connected at their ends by means of copper spacers 66, 67 and 68. FIG. 7 is a sectional view of the interior of the transducer taken along lin 7—7 of FIG. 4. As shown here, and also in FIGS. 5 and 6, most of the interior surface area of the transducer plates are covered by the conductors. Stated otherwise, the horizontal spacing between adjacent conductors is less than the width of the conductors. Preferably the spacing between conductor segments is appreciably less than the width of the segments. For example, the spacing between the 5½" wide strips described previously may be ¼". The grooves 70 and 71 between adjoining pairs of conductors are connected to the channels 41a and 41b (FIG. 2) at the ends of the transducer so that the interior of the transducer may be pressurized.

FIG. 8 is a cross-sectional view similar to FIG. 7 but showing the transducer segments consruction in accordance with another embodiment of the invention. In this case the conductor segments 72a through 72d of the upper array and 73a through 73d of the lower array are arc segments disposed so that their chords lie parallel to one another. The arcs may be segments of circles and ellipses. The conductors are located in upper and lower transducer plates 74a and 74b and are separated by a sheet of insulating material 77. The transducer plates 74a and 74b may be formed of molded rubber pannels which are secured at their edges to form a water-tight seal similarly as described above with respect to FIG. 4. In view of the relatively wide spacing between the conductors of the same array, the transducer plates are provided with rigid structural members 78 and 79 which extend transversely of the conductors. These structural members may take the form of transverse slats spaced at intervals of a foot or less or sheets of rigid plastic or the like laminated within the rubber. As shown in FIG. 8 the conductor cross-sections are semi-circles, i.e. they extend through curvatures of 180°, and this normally will be the maximum curvature employed. Arcs of less curvature may also be used.

Turning now to FIG. 9 there is illustrated yet a further embodiment of the invention in which there is provided a transducer useful in generating seismic signals on land. As shown in FIG. 9, the transducer comprises upper and lower transducer plates 80 and 82 equipped with conforming arrays 84 and 85 of closely spaced conductors. The arrays are separated by suitable insulating material (not shown) of the type described previously with respect to the marine source. In this case, the upper transducer plate is formed as part of a reaction mass 86 which is sufficiently large to provide sufficient inertia so that the force generated between the conductor arrays is emitted primarily via the bottom transducer plate into the ground. The transducer plate may rest directly on the ground or it may be coupled to the ground through water in a suitable container. The operation of the transducer illustrated in FIG. 9 is otherwise the same as that described previously with respect to the marine source. However, because of the much larger acoustic impedance of the earth's crust through which the impulses are transmitted it normally will not be practical to obtain the desired impedance match between the radiating surface and the transmission mediums at the signal frequencies involved. That is, the effective diameter of the base transducer plate 82 normally will not satisfy the criterion that it be equal to at least one-half of the wave length at the center band frequency of the acoustic impulse. The transducer does however offer the advantage of improved timing accuracy since it is fired electronically without a mechanical interaction as in the case of weight-drop or air-gun sources. Also relatively close control over the spectrum of the wave can be achieved by controlling the duration of the electrical current impulse (as determined by the discharge time of the capacitor). In addition the effect of the reaction mass 86 upon the total impedance can be minimized by supporting the reaction mass or the base plate by suitable springs. Thus, the springs interconnecting the base plate and the reaction mass may be compression springs a resonant frequency with the reaction mass which is well below the frequency of the generated signal.

Having described specific embodiments of the present invention, it will be understood that modifications thereof may be suggested to those skilled in the art, and it is intended to cover all such modifications as fall within the scope of the appended claims.

What is claimed is:

1. In a method of imparting acoustic energy into a body of water, the steps comprising:
   (a) disposing in the body of water a planar electroacoustic transducer comprising first and second transducer plates each having a conforming electrical conductive path and which are secured together in a juxtaposed position in which said conductive paths are spaced from one another in a close conforming relationship wherein the internal electrical resistance of said transducer is less than the motional impedance thereof as defined by the relationship:

$$Z_m = \frac{(I\mu_0 l)^2}{(2\pi r_e)2\rho c A}$$

wherein:
   I is the amplitude of said current impulse in amps,
   $\mu_0$ is the permeability of free space,
   l is the common length of said current paths in meters,
   $r_e$ is the effective radial distance between said current paths in meters,
   c is the velocity of sound in said water in meters/sec.,
   $\rho$ is the density of the water in kilograms per cubic meter,
   A is the radiating area of said transducer in square meters, and
   (b) providing an impulse of opposed current flow in adjacent portions of said conductive paths to produce an electromagnetic field between said conforming conductive paths and force said transducer plates apart to generate an acoustic impulse having a center-band frequency of less than 350 Hz and wave length which is less than twice the major planar axis of said transducer.

2. The method of claim 1 wherein said transducer is elongated in shape and is moved through the water along its major axis while repeatedly generating acoustic impulses therefrom.

3. The method of claim 2 wherein the ratio of the length to the width of said transducer is at least 5.

4. The method of claim 3 wherein a plurality of said elongated transducers are moved through the water in a parallel relationship with each other.

5. In an acoustic energy source the combination comprising:
   (a) a first transducer plate having a plurality of elongated electrical conductors of oblong cross section arranged in a first array and in which the minor cross-sectional dimensions of said conductors extend transversely of said plate,
   (b) a second transducer plate having a plurality of elongated electrical conductors of oblong cross section arranged in a second array conforming to said first array and in which the minor cross-sectional dimensions of said conductors extend transversely of said second transducer plate, the cross sections of said conductors being arc segments having the chords of opposing conductors from opposite arrays adjacent one another.
   (c) means securing said first and second transducer plates in a juxtaposed position to one another in which said arrays are spaced from one another in a close conforming relationship, and
   (d) means electrically connecting said conductors to provide for current flow in each pair of adjacent conforming conductors in said first and second arrays in opposite directions whereby the electromagnetic field produced between adjacent conforming conductors forces said transducer plates apart.

6. The combination of claim 5 wherein each of said transducer plates has a major planar axis of at least 2 meters.

7. The combination of claim 5 wherein the ratio of the major cross-sectional dimensions to the minor cross-sectional dimensions of said conductors is at least 2.

8. The combination of claim 5 wherein said arc segments have a curvature of about 180°.

9. The combination of claim 5 wherein the conductors in each of said arrays are connected electrically in series.

10. The combination of claim 5 wherein the spacing between adjacent conductors in the same array is less than the width of said conductors.

11. The combination of claim 10 wherein said conductors have rectangular cross sections in which the ratio of the major dimension to the minor dimension is at least 20.

12. In an acoustic energy source, the combination comprising:
    (a) a first transducer plate having a plurality of elongated electrical conductors arranged in a first array,
    (b) a second transducer plate having a plurality of elongated electrical conductors arranged in a second array conforming to said first array,
    (c) means securing said first and second transducer plates in a juxtaposed position in which said arrays are spaced from one another in a close conforming relationship, said conductors of both arrays being oblong in cross section with the minor cross-sectional dimensions of said conductors extending transversely of said plates and further wherein the cross sections of said conductors are arc segments of about 180° with the chords of opposing conductors from opposite arrays adjacent one another, and
    (d) means electrically connecting said conductors in a series relationship in which the conductors of one array are electrically interposed between the conductors of the other array and connected at adjacent ends so that current flow in the series connected conductors of the first array occurs in a first common direction and in the conductors of the second array occurs in a second common direction opposed to said first direction whereby the electromagnetic field produced between adjacent conforming conductors forces said transducer plates apart.

13. The combination of claim 12 wherein the spacing between adjacent conductors in the same array is less than the width of said conductors.

14. In an acoustic energy source, the combination comprising:
    (a) first and second transducer plates formed of an elastomeric material and secured together at their perimeters to form a water-tight seal.

(b) a first array of elongated electrical conductors of oblong cross section disposed on the interior of said first transducer plate, (c) a second array of elongated electrical conductors of oblong cross-section disposed on the interior of said second transducer plate in a conforming relationship with said first array, said cross sections of said conductors of both arrays additionally being arc segments of about 180° with the chords of opposing conductors from opposite arrays adjacent one another and further comprising rigid members in said transducer plates extending transversely of said conductors to prevent uneven flexing of said plates.

(d) insulating material interposed between the conductors of said first and second array, and (e) means electrically connecting said conductors to provide for current flow in each pair of adjacent conforming conductors in said first and second arrays in opposite directions whereby the electromagnetic field produced between adjacent conforming conductors forces said transducer plates apart.

15. The combination of claim 14 wherein said transducer plates have grooves formed on the interior surfaces of said plates and interposed between said conductors.

16. The combination of claim 15 wherein said conductors are rectangular in cross section and the spacing between adjacent conductors in the same array is substantially less than the width of said conductors.

17. In an acoustic energy source, the combination comprising:

(a) a planar electroacoustic transducer comprising first and second transducer plates each having a conforming electrical conductive path and secured together in a juxtaposed position in which said conductive paths are spaced from one another in a close conforming relationship, (b) a unidirectional voltage source (c) capacitor means connected to said voltage source for storing and discharging electrical energy to produce a current impulse having an amplitude, I, satisfying the relationship:

$$I \geq \frac{2450 \, \pi r_e (AR)^{\frac{1}{2}}}{\mu_o l}$$

said capacitor means having a capacitance, C, satisfying the relationship:

$$C \geq \frac{d_e}{750 R + \frac{(I\mu_o l)^2}{(2\pi r_e)^2 1.5 \times 10^6 A}}$$

wherein:

$d_e$ is the major planar axis of said transducer in meters

A is the radiating area of said transducer in square meters

R is the resistance of said current paths in ohms $\mu_o$ is the permeability of free space l is the total cumulative length of said current paths in meters, $r_e$ is the effective radial distance between said current paths in meters, and (d) means for connecting said capacitor means with said conductive paths to provide opposed current flow in adjacent portions of said conductive paths whereby the electromagnetic field produced between said conforming conductive paths forces said transducer plates apart.

18. In an acoustic energy source for imparting acoustic energy into a body of water, the combination comprising:

(a) a planar electroacoustic transducer adapted to be moved through a body of water and having a major planar axis of at least two meters (b) first and second parallel transducer plates in said transducer (c) a plurality of elongated electrical conductors having cross sections which are arc segments arranged in said first transducer plate in a first array in a configuration in which the minor cross sectional dimensions of said conductors extend transversely of said plate (d) a plurality of elongated electrical conductors having cross sections which are arc segments in said second transducer plate arranged in a second array conforming to said first array in which the minor cross sectional dimensions of said conductors extend transversely of said second plate, the chords of conductors of said first array being adjacent to the chords of conductors of said second array, and (e) means securing said first and second transducer plates in a juxtaposed position relative to one another in which said arrays are spaced from one another in a close conforming relationship and permitting simultaneous movements of said transducer plates in opposite directions with respect to each other.

19. The combination of claim 18 wherein the spacing between adjacent conductors in the same array is less than the width of said conductors.

* * * * *

UNITED STATES PATENT AND TRADEMARK OFFICE
CERTIFICATE OF CORRECTION

PATENT NO. : 4,463,825
DATED : August 7, 1984
INVENTOR(S) : William E. Lerwill

It is certified that error appears in the above-identified patent and that said Letters Patent is hereby corrected as shown below:

In Column 4, equation (3) should read:

$$E = \frac{Zm}{R + Zm} \qquad (3)$$

In Column 4, equation (5) should read:

$$B = \frac{\mu_0 I}{2\pi r} \qquad (5)$$

In Column 8, equation (10) should read:

$$I \geq \frac{2450 \, r_e (AR)^{\frac{1}{2}}}{\mu_0 l} \qquad (10)$$

Signed and Sealed this

Twenty-ninth Day of October 1985

[SEAL]

Attest:

DONALD J. QUIGG

Attesting Officer

Commissioner of Patents and
Trademarks—Designate